United States Patent
McKeever

(10) Patent No.: US 9,651,921 B1
(45) Date of Patent: May 16, 2017

(54) METRONOME EMBEDDED IN SEARCH RESULTS PAGE AND UNAFFECTED BY LOCK SCREEN TRANSITION

(71) Applicant: Google Inc., Mountain View, CA (US)

(72) Inventor: Richard McKeever, Acton, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/060,896

(22) Filed: Mar. 4, 2016

(51) Int. Cl.
*G10H 1/40* (2006.01)
*G04F 5/02* (2006.01)
*G06F 17/30* (2006.01)

(52) U.S. Cl.
CPC ........ *G04F 5/025* (2013.01); *G06F 17/30769* (2013.01); *G06F 17/30864* (2013.01)

(58) Field of Classification Search
CPC ....... G10H 2240/145; G10H 2240/061; G10H 2240/071; G10H 2240/241; G10H 2210/061; G10H 2210/076; G10H 2210/385; G10H 2220/091; G10H 2220/111; G10H 2240/005; G10H 2240/175; G10H 2210/086; G10H 2240/131; G10H 2220/081; G10H 2210/091
See application file for complete search history.

(56) References Cited

U.S. PATENT DOCUMENTS

| | | | |
|---|---|---|---|
| 6,727,419 B1* | 4/2004 | Diaz | A63B 71/0686 368/278 |
| 9,230,526 B1* | 1/2016 | Cook | G10H 1/0033 |
| 9,372,925 B2* | 6/2016 | Ball | G06F 17/3074 |
| 2003/0151628 A1* | 8/2003 | Salter | G09B 5/06 715/773 |
| 2004/0049540 A1* | 3/2004 | Wood | G10H 1/0058 709/203 |
| 2004/0215958 A1* | 10/2004 | Ellis | H04W 4/008 713/155 |

(Continued)

FOREIGN PATENT DOCUMENTS

EP 1 104 209 5/2001

OTHER PUBLICATIONS

International Search Report from PCT/US2016/064914 mailed on Mar. 22, 2017, 14 pages.

(Continued)

*Primary Examiner* — Marlon Fletcher
(74) *Attorney, Agent, or Firm* — Dority & Manning, P.A.

(57) ABSTRACT

The present disclosure provides systems and methods for providing a metronome embedded in a search results page. One example computer-implemented method includes displaying, by a mobile computing device, a search results webpage that includes a metronome user interface. The method includes receiving, by the mobile computing device, a user input that requests implementation of the metronome at a tempo. In response to receiving the user input, the method includes generating, by the mobile computing device, an audio clip that exhibits the tempo. The method includes using, by the mobile computing device, an audio player application to play the audio clip. The audio player application does not experience interruption or latency when the mobile computing device transitions to a lock screen state during playback of the audio clip.

20 Claims, 4 Drawing Sheets

(56) References Cited

U.S. PATENT DOCUMENTS

| | | | | |
|---|---|---|---|---|
| 2007/0079691 | A1* | 4/2007 | Turner | G10H 1/40 84/612 |
| 2008/0190271 | A1* | 8/2008 | Taub | G10H 1/0058 84/645 |
| 2009/0007017 | A1* | 1/2009 | Anzures | G06F 3/04883 715/835 |
| 2009/0027338 | A1* | 1/2009 | Weinberg | G06F 3/017 345/158 |
| 2011/0105193 | A1* | 5/2011 | Lee | G06F 3/0488 455/566 |
| 2012/0005509 | A1* | 1/2012 | Araki | G06F 1/3203 713/323 |
| 2012/0192701 | A1* | 8/2012 | Watanabe | G10H 1/40 84/622 |
| 2012/0297958 | A1* | 11/2012 | Rassool | G06F 3/0481 84/609 |
| 2012/0297959 | A1* | 11/2012 | Serletic | G06F 3/0481 84/626 |
| 2013/0002533 | A1* | 1/2013 | Burroughs | G06F 19/3481 345/156 |
| 2013/0185411 | A1* | 7/2013 | Martin | H04L 63/20 709/224 |
| 2013/0228063 | A1* | 9/2013 | Turner | G10H 1/40 84/612 |
| 2014/0082065 | A1* | 3/2014 | Anakata | H04L 41/0853 709/203 |
| 2014/0164941 | A1* | 6/2014 | Kim | G06F 21/36 715/741 |
| 2014/0310403 | A1* | 10/2014 | Weiss | H04L 41/0813 709/224 |
| 2014/0337651 | A1* | 11/2014 | Ye | G06F 1/3243 713/323 |
| 2015/0019994 | A1* | 1/2015 | Freudenthaler | H04M 1/7253 715/748 |
| 2015/0227752 | A1* | 8/2015 | Anakata | G06F 21/629 726/29 |
| 2015/0378520 | A1* | 12/2015 | Chandrasekaran | G06F 3/0482 715/716 |

OTHER PUBLICATIONS

Stonekick, "Metronome Beats Android App User Guide", https://web.archive.org/web/20150219195343/http://www.stonekick.com/metronome_guide.html, Feb. 19, 2015, retreived from Internet on Mar. 31, 2017, 2 pages.

Szpak, "Free Metronome Online Best Metronome.com—Download Metronome for Mobile", http://bestmetronome.com/j2me, Dec. 31, 2011, retrieved from Internet on Mar. 31, 2017, 1 page.

* cited by examiner

METRONOME EMBEDDED IN SEARCH RESULTS PAGE AND UNAFFECTED BY LOCK SCREEN TRANSITION

FIELD

The present disclosure relates generally to a metronome implemented by a computing device and, more particularly, to a metronome embedded in a search results page that is capable of playback unaffected by a lock screen transition of the computing device.

BACKGROUND

A metronome is a device that produces regular, metrical sounds (e.g., ticks or clicks) according to fixed period or tempo. For example, a metronome can adhere to a tempo defined in beats per minute. In some metronomes, the tempo of the metronome can be adjustable or otherwise user settable.

One common usage of a metronome is to assist a musician during playing of an instrument. For example, a metronome can be used by musicians to help keep a steady tempo as they play, to work on issues of irregular timing, or to help internalize a clear sense of timing and tempo.

As metronomes are used to mark time and assist in keeping a steady tempo, it is important that the operation of the metronome is reliable, consistent, and uninterrupted. For example, a metronome should not skip a beat or otherwise fail to adhere to the correct tempo. Further, the metronome should not cease producing the sound until it is desired by the user to do so.

Certain mobile computing devices (e.g., a smartphone or a tablet computer) can serve as a metronome. In one example, a user can load a webpage in a browser application of the mobile computing device and can interact with the webpage to cause the mobile computing device to serve as a metronome. For example, the mobile computing device can execute instructions included in the webpage which cause the device to regularly produce the sounds according to a desired tempo.

However, mobile browser applications typically impose constraints that make the above described use of the mobile computing device as a metronome difficult. In particular, audio associated with a mobile web browser typically experiences latency or playback issues when the mobile computing device transitions into a lock screen state, turns off the screen, or otherwise changes states or operational modes. Many mobile computing devices automatically transition into such a lock screen state after a period of inactivity.

As one example, certain typical mobile web browsers use the Web Audio API to cause playback of audio by the mobile computing device. However, audio generated on-the-fly via the Web Audio API will automatically be stopped within fifteen seconds of the mobile computing device transitioning into the lock screen state.

Thus, a user can load a webpage in a browser application of the mobile computing device and start the metronome. However, after a certain period (e.g., thirty seconds) the mobile computing device may transition to the lock screen state and the metronome will cease. Such results in a frustrating experience for the user as the metronome operation ends while the user is still practicing and the user is forced to choose between continuing to practice without the metronome or stopping practice to unlock the device and again start the metronome.

As another example, an audio clip that is set to loop or looped via JavaScript executed by the mobile browser application (e.g., as a part of the webpage) will either stop automatically or be affected by increased latency when the screen turns off. Such latency by the device again provides a frustrating experience for the user, as the user may be thrown off-beat or otherwise struggle to adjust their playing to the latency of the device.

Furthermore, certain metronomes implemented through mobile browser applications have varied timing accuracy and consistency even when the screen is on. Such metronomes simply do not provide reliable service.

Thus, metronomes implemented through mobile web browsers are typically unreliable as they may undesirably cease producing sound or skip a beat due to latency upon transition of the mobile computing device into a lock screen state.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for providing a metronome unaffected by a lock screen transition. The method includes displaying, by a mobile computing device, a search results webpage that includes a metronome user interface. The method includes receiving, by the mobile computing device, a user input that requests implementation of the metronome at a tempo. In response to receiving the user input, the method includes generating, by the mobile computing device, an audio clip that exhibits the tempo. The method includes using, by the mobile computing device, an audio player application to play the audio clip. The audio player application does not experience interruption or latency when the mobile computing device transitions to a lock screen state during playback of the audio clip.

Another example aspect of the present disclosure is directed to a mobile computing device that provides a metronome unaffected by a lock screen transition. The mobile computing device includes at least one processor and at least one non-transitory computer-readable medium. The at least one non-transitory computer-readable medium stores instructions that, when executed by the at least one processor, cause the mobile computing device to display a search results webpage that includes a metronome user interface; receive a user input that requests implementation of the metronome at a tempo; in response to receipt of the user input, generate an audio clip that exhibits the tempo; and use an audio player application to play the audio clip. The audio player application does not experience interruption or latency when the mobile computing device transitions to a lock screen state during playback of the audio clip.

Another example aspect of the present disclosure is directed to at least one non-transitory computer-readable medium that stores instructions. When executed by at least one processor, the instructions cause the at least one processor to display a user interface within a webpage provided by a browser application of a computing device. The user interface enables implementation of a periodic audible indicator. When executed by at least one processor, the instructions further cause the at least one processor to, in response to receipt of a user input that requests implementation of the periodic audible indicator at a tempo, provide the periodic audible indicator at the tempo. The periodic audible indicator is operable through the browser application regardless of a device state of the computing device.

Other aspects of the present disclosure are directed to systems, methods, apparatus, and tangible non-transitory computer-readable media for implementing one or more aspects described herein.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

Figure 1:
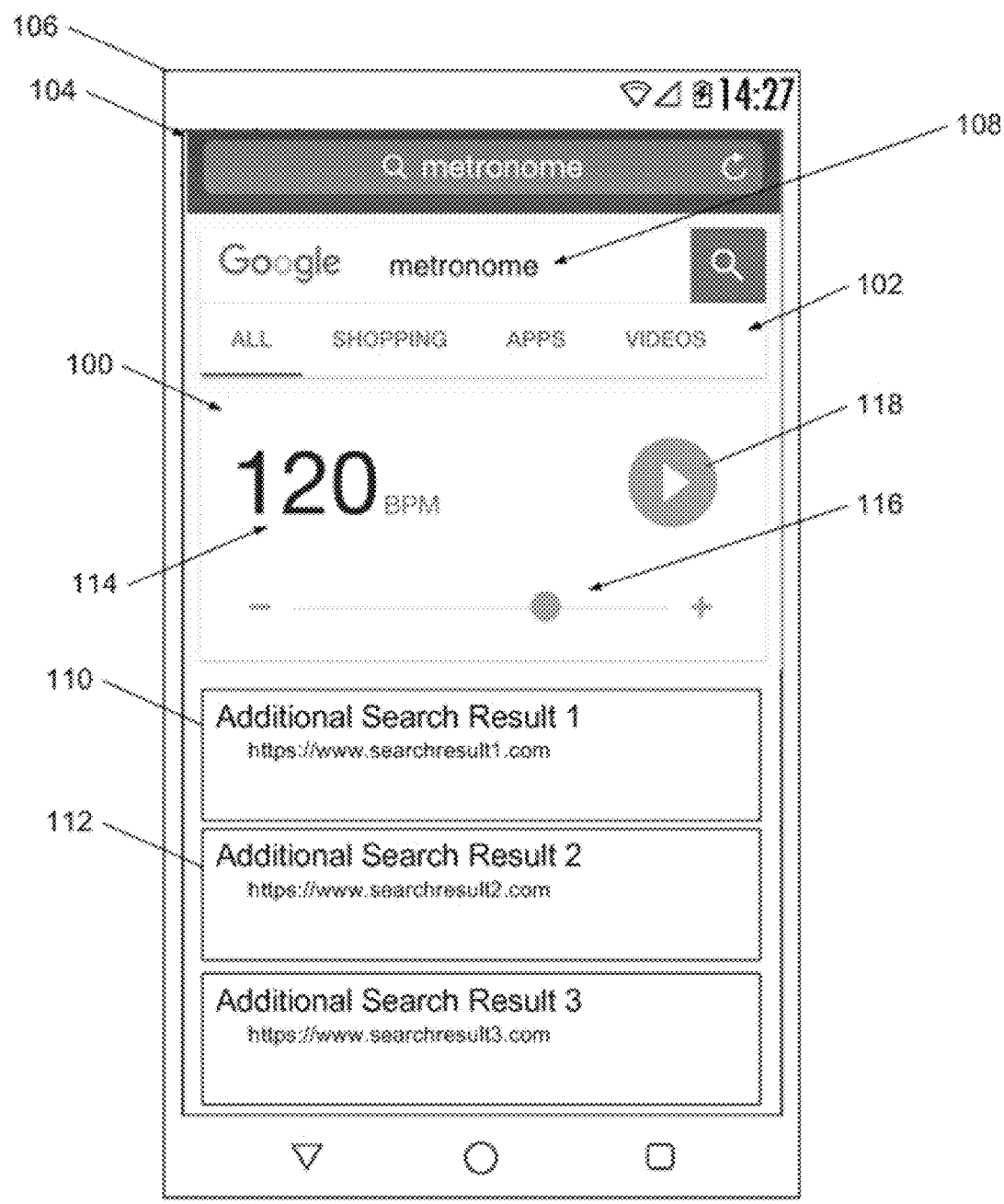
FIG. 1 depicts an example user interface of a metronome embedded in a search results page according to example embodiments of the present disclosure.

Generally, the present disclosure provides a metronome embedded in a search results page that is capable of playback unaffected by a lock screen or other device state transition of a mobile computing device.

In particular, a web-based metronome can be provided in a search results page in response to relevant search queries (e.g., a search for the word "metronome"). For example, a browser application of a mobile computing device such as a smartphone or tablet computing device can provide the search results page in response to a relevant search query.

The search results page can include a metronome user interface. A user can interact with the user interface included in the search results page to request implementation of the metronome at a particular tempo. For example, the tempo can be user-selectable.

According to an aspect of the present disclosure, in response to the user input, the browser application of the mobile computing device can dynamically generate an audio clip at the selected tempo. The audio clip can be long enough to be useful for a typical musician's practice session.

The mobile computing device can utilize an audio player application of the mobile computing device to play the audio clip. The audio player application can reliably play music clips even when the screen of the device is off. More particularly, the audio player application does not experience interruption or latency when the mobile computing device transitions to a lock screen state during playback of the audio clip.

As such, use of the audio player application to play the audio clip moves responsibility for control of playback away from the browser application, thereby eliminating latency or other issues typically associated with audio playback through mobile web browsers.

In some implementations, the audio player application can be a native audio player application included in an operating system of the mobile computing device. Thus, as an example, the browser application can generate the audio clip and then call the native audio player application to support playback of the audio clip.

In some implementations, the mobile computing device can generate the audio clip by executing a client-side JavaScript code included in the search results webpage. For example, generating the complete audio clip offline and/or on a server computing device can require an unacceptably large data transfer. Thus, dynamic local creation of the audio clip can obviate the need for a data transfer that requires a relatively large amount of time and/or computing resources.

In some implementations, the mobile computing device can generate an MP3-encoded audio clip that exhibits the tempo. In such implementations, the mobile computing device can use an MP3 audio player application to play the audio clip. In particular, use of MP3 encoding can be beneficial as MP3 is widely and reliably supported by all major browser applications. Further, MP3-encoded audio clips are relatively size-efficient.

In some implementations, to generate the audio clip for a given tempo, the mobile computing device can implement one of two different approaches depending on the selected tempo. In particular, in some implementations, the particular approach used can be selected based on a determination of whether generation of the audio clip for the given tempo is achievable using concatenations of a standard audio frames such as a standard click audio frame and a standard silence audio frame.

In some implementations, the determination of the achievability of generation of the audio clip using the standard frames can be based on a comparison of a beat duration of the particular tempo with an audio encoding frame duration (e.g., the universal MP3 frame duration). For example, it can be determined whether the beat duration of selected tempo is satisfactorily dividable by the audio encoding frame duration.

In instances in which the audio clip is achievable using the standard audio frames, the mobile computing device can concatenate standard audio frames (e.g., the standard click audio frame and the standard silence audio frame) to generate the audio clip that exhibits the tempo. In some implementations, the standard audio frames are tiny offline-encoded MP3 frames. In some implementations, the standard audio frames can be included inline in a JavaScript code included in the search results webpage. The standard frames can be concatenated a large number of times to generate the audio clip.

For tempos where the first approach described above does not achieve acceptable error in fitting n beats per minute, a second approach can be used. In the second approach, the smallest possible multiples of entire beats at such tempos can be encoded (e.g., offline and stored at a server computing device). Thereafter, the smallest possible multiple for a particular tempo requested by a user can be duplicated in the browser application of the mobile computing device to achieve n beats per minute with acceptable error.

In the second approach, the offline encoding can shift the frame-alignment of the clicking or other periodic sound in a way that cannot realistically be achieved with the first approach described above. Therefore, the second approach can provide relatively higher precision that is increasingly necessary as the tempo setting increases in magnitude (e.g., gets "faster").

Further, since the offline-generated beats in the second approach are typically larger that is desirable to transfer from the server computing device to the mobile computing device, two stages of compression beyond audio compression (e.g., beyond MP3 compression) can be applied. As one example, all of the audio encoded frames (e.g., MP3 frames) for all of the tempos which require the second approach can be hashed. Next, the duplicate headers and duplicate bodies from the whole frame set can be removed in a way that can easily be reversed (e.g., can easily be reversed by execution of JavaScript code). Finally, the resulting dataset of binary data can be gzipped to compress what is essentially the silence between clicks. The audio content which has been compressed in this fashion can be transferred in a 99% smaller form than it would be as plain audio encoded files (e.g., plain MP3 files).

Thus, in some implementations, a single dataset can be transmitted to the mobile computing device that includes the smallest possible multiples of entire beats for each tempo for which the second approach is required. In some instances such smallest possible multiples can be referred to as beat units. When an audio clip that exhibits one of such tempos is required, the mobile computing device can retrieve the appropriate beat unit for the particular tempo and then duplicate or otherwise multiply such beat unit to generate the audio clip that exhibits the particular tempo.

Thus, the present disclosure provides systems and methods that enable a web-based metronome that works reliably even when a screen of a mobile computing device is turned off or the mobile computing device otherwise changes states.

As used herein, a metronome includes any recurrent tone pattern generator, where tempo is fixed, and the tone pattern is comprised of one or more tone elements. As one example, a click can be characterized as one tone element. The click tone element can be combined with other tone elements to provide a repeating tone pattern such as, for example, a repeating pattern of click, hiss, and silence tone patterns. Furthermore, although use of a metronome by musicians is given as one example use, the present disclosure is not limited to such example use. In particular, as further examples, metronome applications such as measuring cadence for exercise, dance, or other activities are also contemplated by the present disclosure.

With reference now to the Figures, example aspects of the present disclosure will now be discussed in further detail.

FIG. 1 depicts an example user interface 100 of a metronome embedded in a search results page 102 according to example embodiments of the present disclosure. In particular, a browser application of a mobile computing device 106 has executed data which causes display of the webpage 102 on a display 104 of the mobile computing device 106.

In some implementations, the browser application of the mobile computing device 106 can display the search results page 102 in response to a user query 108 that is relevant to a metronome. The search results page 102 can include the user interface 100 as a relevant result and can also include any number of additional results (e.g., additional search result 110 and additional search result 112).

According to an aspect of the present disclosure, a user can interact with the user interface 100 included in the search results page 102 to request implementation of the metronome at a particular tempo. For example, the user interface 100 visibly displays a current tempo setting (e.g., shown at 114 as 120 beats per minute). The user interface 100 further includes a sliding bar 116 that enables the user to adjust the current tempo setting (e.g., to faster or slower tempos).

The user interface 100 also includes a play button, icon, or other feature 118 that enables the user to request implementation of the metronome at the current tempo setting. In particular, according to an aspect of the present disclosure, in response to a user selection of the play button 118, the browser application can generate an audio clip that is played back by an audio player application of the mobile computing device 106.

The particular user interface 100 and associated icons, buttons, and features depicted in FIG. 1 are provided as examples only. The systems and methods of the present disclosure are not limited to the particular user interface 100 illustrated in FIG. 1 but, instead, can be implemented using many different user interfaces with various designs, appearances, features, etc.

Figure 2:
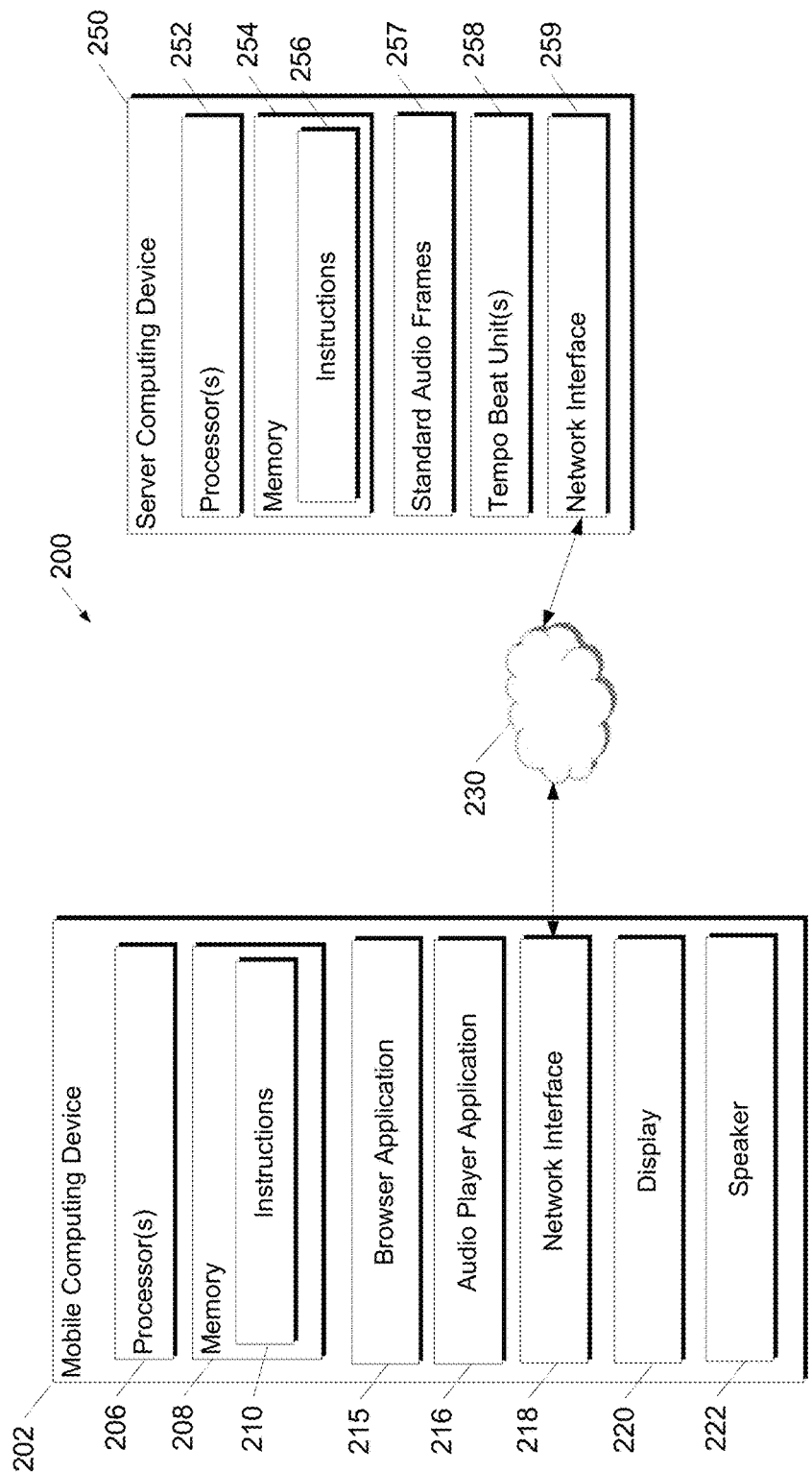
FIG. 2 depicts a block diagram an example computing system according to example embodiments of the present disclosure.

FIG. 2 depicts a block diagram an example computing system 200 according to example embodiments of the present disclosure. The system includes a mobile computing device 202 that implements a metronome via a browser application 215.

The mobile computing device 202 can be any form of mobile device, such as a smartphone, tablet, wearable computing device (e.g., computing device embedded in a pair of eyeglasses, a wristband, a necklace, etc.), handheld computing device, computing device embedded in a vehicle, etc. Further, although the systems and methods of the present disclosure are particularly beneficial when applied in the context of a mobile computing device, they are not limited to that scenario. Instead, the present disclosure can be implemented on any computing device, whether mobile or non-mobile.

The mobile computing device 202 includes one or more processors 206 and a memory 208. The one or more processors 206 can be any form of processing device, including, for example, a processing unit, a microprocessor, a controller, a microcontroller, an application specific integrated circuit, etc. The memory 208 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 208 can store one or more sets of instructions 210 that, when executed by the mobile computing device 202, cause the mobile computing device 202 to perform operations consistent with the present disclosure.

The mobile computing device 202 includes a browser application 215. The browser application can be implemented by the one or more processors 206. The browser application 215 can retrieve, present, and traverse information resources from the World Wide Web. The browser application 215 can be a mobile web browser such as, for example, the Chrome™ mobile web browser for iOS™ or Android™, the Safari™ mobile web browser for iOS™, the Firefox™ mobile web browser for iOS™ or Android™, etc.

The mobile computing device 202 includes an audio player application 216. The audio player application can be implemented by the one or more processors 206. The audio player application 216 can cause playback of audio by the speaker 222. In some implementations, the audio player application 216 can be a native audio player application included in an operating system of the mobile computing device 202. In other implementations, the audio player application 216 can be a third party audio player application. The audio player application 216 can be separate and distinct from but interoperable with the browser application 215.

According to an aspect of the present disclosure, the audio player application 216 can reliably play audio clips even when a display 220 of the mobile computing device 202 is off or otherwise powered down. More particularly, the audio player application 216 does not experience interruption or latency when the mobile computing device 202 transitions to a lock screen state during playback of an audio clip.

The browser application 215 and the audio player application 216 each include computer logic utilized to provide desired functionality. Each of the browser application 215 and the audio player application 216 can be implemented in hardware, firmware, and/or software controlling a general purpose processor. For example, in some implementations, each of the browser application 215 and the audio player application 216 includes program files stored on a storage device, loaded into a memory and executed by one or more processors. In other implementations, each of the browser application 215 and the audio player application 216 includes one or more sets of computer-executable instructions that are stored in a tangible computer-readable storage medium such as RAM hard disk or optical or magnetic media.

The mobile computing device 202 can further include a network interface 218, the display 220, and the speaker 222. The network interface 218 can enable communications over a network 230. The network interface 218 can include any number of components to provide networked communications (e.g., transceivers, antennas, controllers, cards, etc.).

The display 220 can include different types of display components, such as, for example, a light-emitting diode display (e.g., organic light-emitting diode display), a liquid-crystal display (e.g., thin-film-transistor liquid-crystal display), a thin-film diode display, etc. In some implementations, the display 220 can also be touch-sensitive. For example, the display can be a capacitive touchscreen, a resistive touchscreen, or other touch-sensitive technologies.

The speaker 222 can be an electromechanical device that produces sound, as is well known in the art. For example, the speaker 222 can receive an electrical signal and can produce sound based on the electrical signal.

In some implementations, the mobile computing device 202 can communicatively connect to a server computing device 250 over the network 230. The server computing device 250 can include one or more processors 252 and a memory 254. The one or more processors 252 can be any form of processing device, including, for example, a processing unit, a microprocessor, a controller, a microcontroller, an application specific integrated circuit, etc. The memory 254 can include one or more of any non-transitory computer-readable medium, including, for example, RAM (e.g., DRAM), ROM (e.g., EEPROM), optical storage, magnetic storage, flash storage, solid-state storage, hard drives, or some combination thereof. The memory 254 can store one or more sets of instructions 256 that, when executed by the server computing device 250, cause the server computing device 250 to perform operations consistent with the present disclosure.

The server computing device 250 can further include or store a number of standard audio frames 257. For example, the standard audio frames 257 can include a standard click audio frame and a standard silence audio frame. In some implementations, the standard audio frames are tiny offline-encoded MP3 frames. In some implementations, the standard audio frames can be included inline in a JavaScript code provided to the mobile computing device 202 as a portion of a search results webpage.

The server computing device 250 can further include or store a plurality of tempo beat units 258. Each tempo beat unit 258 can correspond to a smallest possible multiple of entire beat for a particular tempo. In some implementations, the tempo beat units 258 are produced offline, stored at the server computing device 250, and then provided to the mobile computing device 202 over network 230 when needed.

In some implementations, the tempo beat units 257 are compressed into a single dataset or data file. For example, two stages of compression beyond audio compression (e.g., beyond MP3 compression) can be applied to the tempo beat units 257. As one example, all of the audio encoded frames (e.g., MP3 frames) which represent the smallest possible multiples of respective beats for a set of tempos can be hashed. Next, the duplicate headers and duplicate bodies from the whole frame set can be removed in a way that can easily be reversed (e.g., can easily be reversed by execution of JavaScript code). Finally, the resulting dataset of binary data can be gzipped to compress what is essentially the silence between clicks. The tempo beat units 258 that have been compressed in this fashion can be transferred in a 99% smaller form than they would be as plain audio encoded files (e.g., plain MP3 files).

The server computing device 250 can further include a network interface 259. The network interface 259 can enable communications over the network 230. The network interface 259 can include any number of components to provide networked communications (e.g., transceivers, antennas, controllers, cards, etc.).

The network 230 can be any type of communications network, such as a local area network (e.g., intranet), wide area network (e.g., Internet), or some combination thereof and can include any number of wired or wireless links. In general, communication between the server computing device 250 and the mobile computing device 202 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing device 250 can communicate with the mobile computing device 202 over network 230 by sending and receiving data.

Further, any of the processes, operations, programs, applications, or instructions described as being stored at or performed by the server computing device 250 can instead be stored at or performed by the mobile computing device 202 in whole or in part, and vice versa.

Figure 3:
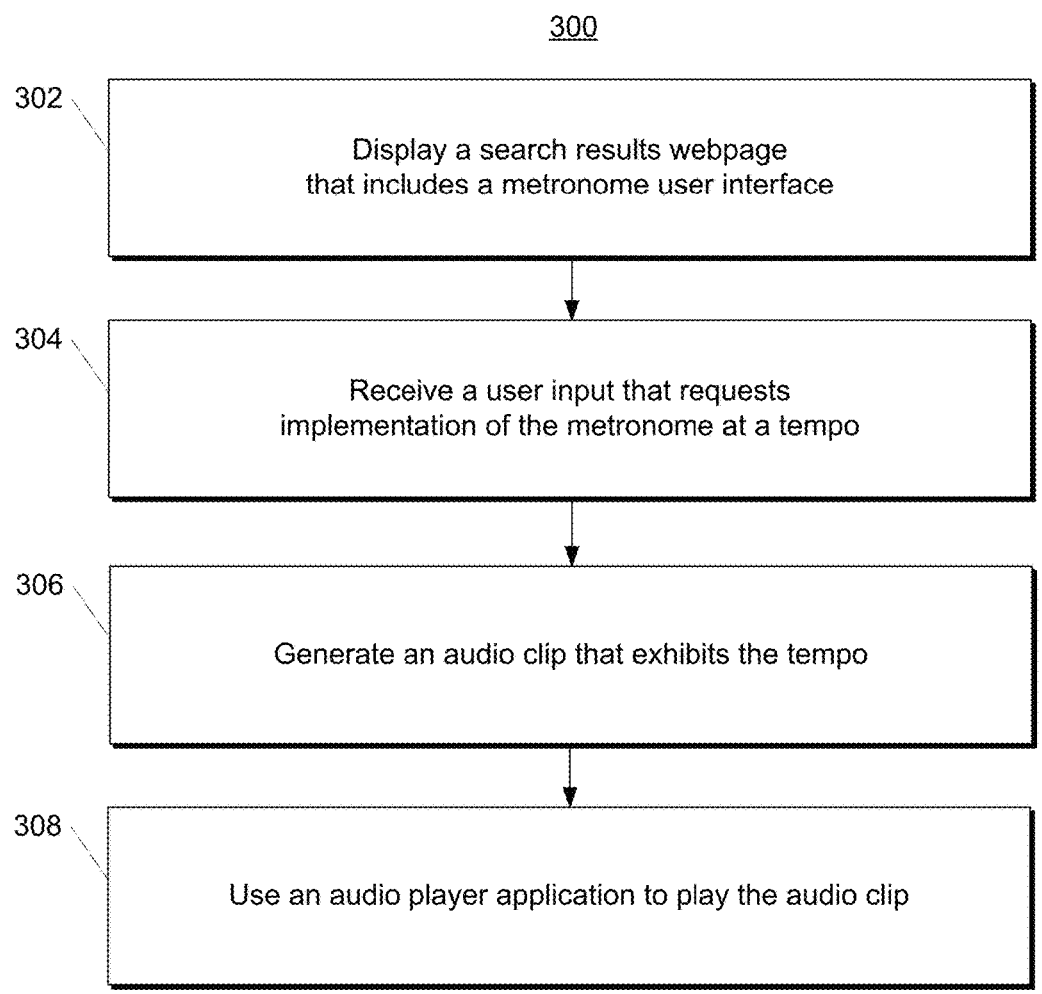
FIG. 3 depicts a flow chart diagram of an example method to implement a metronome according to example embodiments of the present disclosure.

FIG. 3 depicts a flow chart diagram of an example method 300 to implement a metronome according to example embodiments of the present disclosure. Although example method 300 will be discussed with reference to system 200 of FIG. 2, the method 300 can be implemented by any suitable computing device.

At 302, the mobile computing device 202 displays a search results webpage that includes a metronome user interface. For example, the browser application 215 can interact with the server computing device to receive data that corresponds to the search results webpage in response to submission of a user query that is relevant to a metronome. The webpage can include a metronome user interface, such as, for example, user interface 100 as illustrated in FIG. 1. In some implementations, the webpage can include JavaScript code which, when executed by the browser application 215, causes the browser application 215 to display the user interface of the metronome within the webpage.

At 304, the mobile computing device 202 receives a user input that requests implementation of the metronome at a tempo. For example, the user can interact with the browser application 215 to select a particular tempo and then request implementation of the metronome at such tempo.

At 306, the mobile computing device 202 generates an audio clip that exhibits the tempo. For example, the browser application 215 can generate the audio clip in response to receipt of the user input.

In some implementations, the mobile computing device 202 can generate the audio clip at 306 by executing a client-side JavaScript code included in the search results webpage to generate the audio clip. In some implementations, the mobile computing device 202 can generate the audio clip at 306 by generating an MP3-encoded audio clip.

At 308, the mobile computing device 202 uses an audio player application to play the audio clip. The audio player application does not experience interruption or latency when the mobile computing device transitions to a lock screen state during playback of the audio clip. For example, the mobile computing device 202 can use audio player application 216 to play the audio clip.

In some implementations, to play the audio clip at 308, the mobile computing device 202 can use a native audio player application included in an operating system of the mobile computing device 202. In some implementations, to play the audio clip at 308, the mobile computing device 202 can use an MP3 audio player application.

Figure 4:
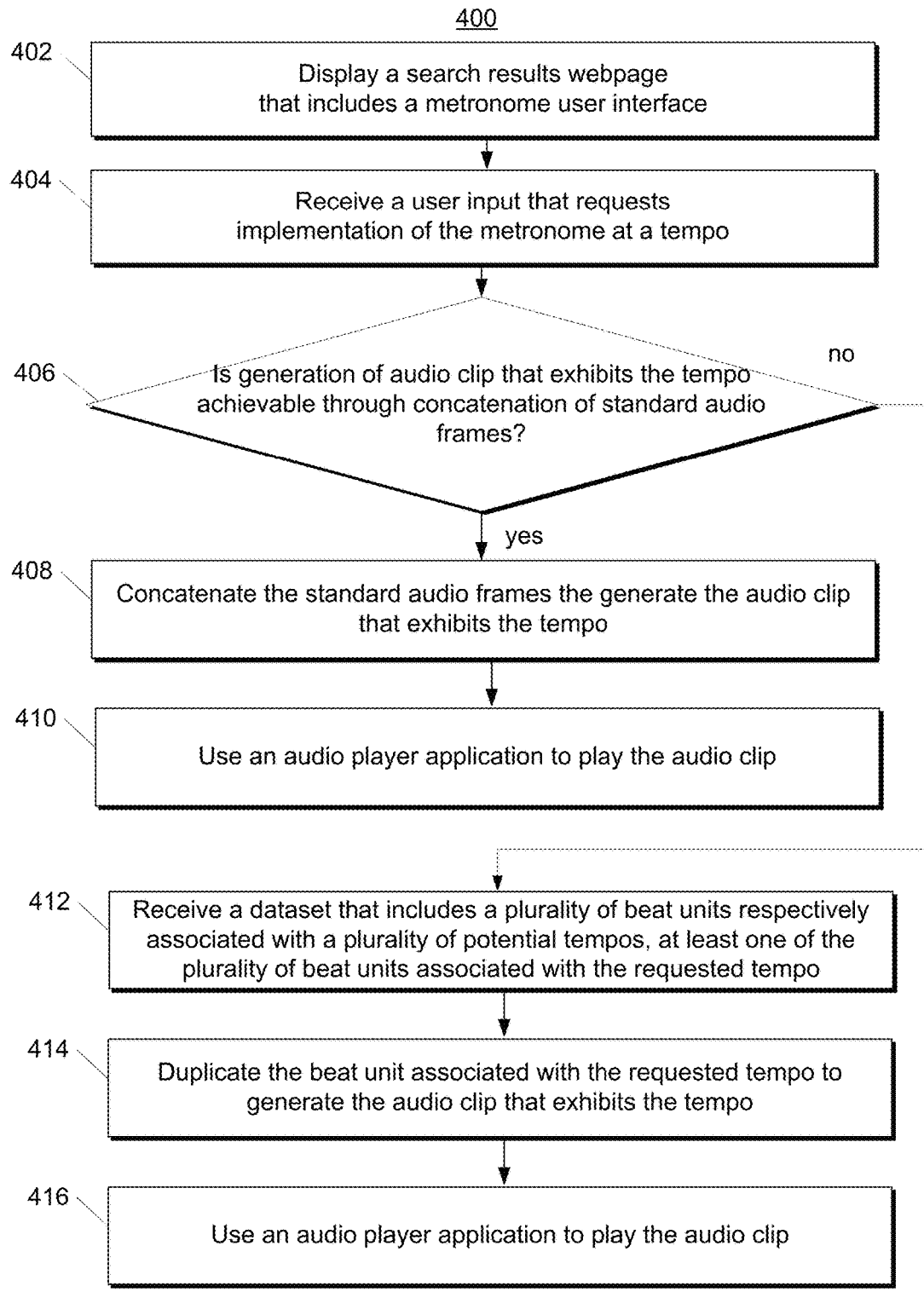
FIG. 4 depicts a flow chart diagram of an example method to implement a metronome according to example embodiments of the present disclosure.

FIG. 4 depicts a flow chart diagram of an example method 400 to implement a metronome according to example embodiments of the present disclosure. Although example method 400 will be discussed with reference to system 200 of FIG. 2, the method 400 can be implemented by any suitable computing device.

At 402, the mobile computing device 202 displays a search results webpage that includes a metronome user interface. For example, the browser application 215 can interact with the server computing device to receive data that corresponds to the search results webpage in response to submission of a user query that is relevant to a metronome. The webpage can include a metronome user interface, such as, for example, user interface 100 as illustrated in FIG. 1. In some implementations, the webpage can include JavaScript code which, when executed by the browser application 215, causes the browser application 215 to display the user interface of the metronome within the webpage.

At 404, the mobile computing device 202 receives a user input that requests implementation of the metronome at a tempo. For example, the user can interact with the browser application 215 to select a particular tempo and then request implementation of the metronome at such tempo.

At 406, the mobile computing device 202 determines whether generation of the audio clip that exhibits the tempo is achievable using concatenations of standard audio frames. In some implementations, determining whether generation of the audio clip that exhibits the tempo is achievable using concatenations of standard audio frames at 406 can include comparing a beat duration of the tempo with an audio encoding frame duration (e.g., the universal MP3 frame). For example, it can be determined whether the beat duration of selected tempo is satisfactorily dividable by the audio encoding frame duration.

If it is determined at 406 that generation of the audio clip that exhibits the tempo is achievable using concatenations of standard audio frames, then method 400 proceeds to 408.

At 408, the mobile computing device 202 concatenates the standard audio frames to generate the audio clip that exhibits the tempo. In some implementations, the standard audio frames are included inline in a JavaScript code included in the webpage.

At 410, the mobile computing device 202 uses an audio player application to play the audio clip. The audio player application does not experience interruption or latency when the mobile computing device transitions to a lock screen state during playback of the audio clip. For example, the mobile computing device 202 can use audio player application 216 to play the audio clip.

However, if it is determined at 406 that generation of the audio clip that exhibits the tempo is not achievable using concatenations of standard audio frames, then method 400 proceeds to 412.

At 412, the mobile computing device 202 receives a dataset that includes a plurality of beat units respectively associated with a plurality of potential tempos. At least one of the plurality of beat units is associated with the requested tempo. For example, each beat unit for a particular tempo can correspond to a smallest possible multiple of an entire beat for such tempo.

At 414, the mobile computing device 202 duplicates or otherwise multiplies the beat unit associated with the requested tempo to generate the audio clip that exhibits the tempo.

At 416, the mobile computing device 202 uses an audio player application to play the audio clip. The audio player application does not experience interruption or latency when the mobile computing device transitions to a lock screen state during playback of the audio clip. For example, the mobile computing device 202 can use audio player application 216 to play the audio clip.

The technology discussed herein makes reference to servers, databases, software applications, and other computer-based systems, as well as actions taken by and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to various specific example embodiments thereof, each example embodiment is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations, and/or additions to the present subject matter as would be readily apparent to one of ordinary skill in the art. For instance, features illustrated or described as part of one embodiment or implementation can be used with another embodiment or implementation to yield a still further embodiment. Thus, the present disclosure includes such alterations, variations, and equivalents.

In addition, although FIGS. 3-4 depicts steps performed in a particular order for purposes of illustration and discussion, the methods of the present disclosure are not limited to the particularly illustrated order or arrangement. The various steps illustrated in FIGS. 3-4 can respectively be omitted, rearranged, combined, and/or adapted in various ways without deviating from the scope of the present disclosure.

What is claimed is:

1. A computer-implemented method for providing a metronome unaffected by a lock screen transition, the method comprising:
   displaying, by a browser application of a mobile computing device, a search results webpage that includes a metronome user interface, wherein the search results webpage is responsive to a search query entered by a user that is relevant to the metronome;
   receiving, by the mobile computing device, a user input that requests implementation of the metronome at a tempo;
   in response to receiving the user input, generating, by the browser application of the mobile computing device, an audio clip that exhibits the tempo;
   transferring, by the mobile computing device, the audio clip from the browser application to an audio player application of the mobile computing devices; and
   using, by the mobile computing device, the audio player application to play the audio clip, wherein the audio player application does not experience interruption or latency when the mobile computing device transitions to a lock screen state during playback of the audio clip.

2. The computer-implemented method of claim 1, wherein generating, by the browser application of the mobile computing device, the audio clip comprises executing, by the mobile computing device, a client-side JavaScript code included in the search results webpage to generate the audio clip.

3. The computer-implemented method of claim 1, wherein using, by the mobile computing device, the audio player application to play the audio clip comprises using, by the mobile computing device, a native audio player application included in an operating system of the mobile computing device to play the audio clip.

4. The computer-implemented method of claim 1, wherein:
   generating, by the browser application of the mobile computing device, the audio clip that exhibits the tempo comprises generating, by the browser application of the mobile computing device, an MP3-encoded audio clip that exhibits the tempo; and
   using, by the mobile computing device, the audio player application to play the audio clip comprises using, by the mobile computing device, an MP3 audio player application to play the audio clip.

5. The computer-implemented method of claim 1, wherein generating, by the browser application of the mobile computing device, the audio clip comprises:
   determining, by the mobile computing device, whether generation of the audio clip that exhibits the tempo is achievable using concatenations of a standard click audio frame and a standard silence audio frame; and
   in response to a determination that generation of the audio clip that exhibits the tempo is achievable using concatenations of the standard audio frames, concatenating, by the mobile computing device, the standard click audio frame and the standard silence audio frame to generate the audio clip that exhibits the tempo.

6. The computer-implemented method of claim 5, wherein determining, by the mobile computing device, whether generation of the audio clip that exhibits the tempo is achievable using concatenations of the standard click audio frame and the standard silence audio frame comprises comparing a beat duration of the tempo with an audio encoding frame duration.

7. The computer-implemented method of claim 5, wherein the standard click audio frame and the standard silence audio frame are included inline in a JavaScript code included in the webpage.

8. The computer-implemented method of claim 5, wherein generating, by the browser application of the mobile computing device, the audio clip further comprises:
   in response to a determination that generation of the audio clip that exhibits the tempo is not achievable using concatenations of the standard audio frames:
      receiving, by the mobile computing device, a dataset that includes a plurality of beat units respectively associated with a plurality of potential tempos, at least one of the plurality of beat units associated with the tempo requested by the user; and
      duplicating, by the mobile computing device, the beat unit associated with the tempo requested by the user to generate the audio clip.

9. A mobile computing device that provides a metronome unaffected by a lock screen transition, the mobile computing device comprising:
   at least one processor;
   a mobile browser application implemented by the at least one processor, the mobile browser application configured to:
      display a search results webpage that includes a metronome user interface, wherein the search results page is provided in response to a search query entered by a user that is relevant to the metronome;
      receive a user input that requests implementation of the metronome at a tempo;
      in response to receipt of the user input, generate an audio clip that exhibits the tempo; and
      transfer the audio clip to an audio player application; and
   the audio player application implemented by the at least one processor, the audio player application configured to:
      play the audio clip, wherein the audio player application does not experience interruption or latency when the mobile computing device transitions to a lock screen state during playback of the audio clip.

10. The mobile computing device of claim 9, wherein the audio player application comprises a native audio player application included in an operating system of the mobile computing device.

11. The mobile computing device of claim 9, wherein the audio clip comprises an MP3 audio clip, and wherein the audio player application comprises an MP3 audio player application.

12. The mobile computing device of claim 9, wherein to generate the audio clip that exhibits the tempo, the browser application executes a client-side JavaScript code included in the search results webpage.

13. The mobile computing device of claim 9, wherein to generate the audio clip that exhibits the tempo, the browser application:
   determines whether generation of the audio clip that exhibits the tempo is achievable using concatenations of a standard click audio frame and a standard silence audio frame; and
   in response to a determination that generation of the audio clip that exhibits the tempo is achievable using concatenations of the standard audio frames, concatenates the standard click audio frame and the standard silence audio frame to generate the audio clip that exhibits the tempo.

14. The mobile computing device of claim 9, wherein to generate the audio clip that exhibits the tempo, the browser application:
- in response to a determination that generation of the audio clip that exhibits the tempo is not achievable using concatenations of the standard audio frames:
  - receives a dataset that includes a plurality of beat units respectively associated with a plurality of potential tempos, at least one of the plurality of beat units associated with the tempo requested by the user; and
  - duplicates the beat unit associated with the tempo requested by the user to generate the audio clip.

15. A computer-implemented method for providing a metronome unaffected by a lock screen transition, the method comprising:
- displaying, by a mobile computing device, a search results webpage that includes a metronome user interface;
- receiving, by the mobile computing device, a user input that requests implementation of the metronome at a tempo;
- in response to receiving the user input, generating, by the mobile computing device, an audio clip that exhibits the tempo, wherein generating, by the browser application of the mobile computing device, the audio clip comprises:
  - determining, by the mobile computing device, whether generation of the audio clip that exhibits the tempo is achievable using concatenations of a standard click audio frame and a standard silence audio frame; and
  - in response to a determination that generation of the audio clip that exhibits the tempo is achievable using concatenations of the standard audio frames, concatenating, by the mobile computing device, the standard click audio frame and the standard silence audio frame to generate the audio clip that exhibits the tempo; and
- using, by the mobile computing device, an audio player application to play the audio clip, wherein the audio player application does not experience interruption or latency when the mobile computing device transitions to a lock screen state during playback of the audio clip.

16. The computer-implemented method of claim 15, wherein determining, by the mobile computing device, whether generation of the audio clip that exhibits the tempo is achievable using concatenations of the standard click audio frame and the standard silence audio frame comprises comparing a beat duration of the tempo with an audio encoding frame duration.

17. The computer-implemented method of claim 15, wherein the standard click audio frame and the standard silence audio frame are included inline in a JavaScript code included in the webpage.

18. The computer-implemented method of claim 15, wherein generating, by the mobile computing device, the audio clip further comprises:
- in response to a determination that generation of the audio clip that exhibits the tempo is not achievable using concatenations of the standard audio frames:
  - receiving, by the mobile computing device, a dataset that includes a plurality of beat units respectively associated with a plurality of potential tempos, at least one of the plurality of beat units associated with the tempo requested by the user; and
  - duplicating, by the mobile computing device, the beat unit associated with the tempo requested by the user to generate the audio clip.

19. The computer-implemented method of claim 15, wherein generating, by the mobile computing device, the audio clip comprises executing, by the mobile computing device, a client-side JavaScript code included in the search results webpage to generate the audio clip.

20. The computer-implemented method of claim 15, wherein using, by the mobile computing device, the audio player application to play the audio clip comprises using, by the mobile computing device, a native audio player application included in an operating system of the mobile computing device to play the audio clip.

* * * * *